April 7, 1964 E. J. HERBENAR 3,128,110
BALL JOINT
Filed May 3, 1961
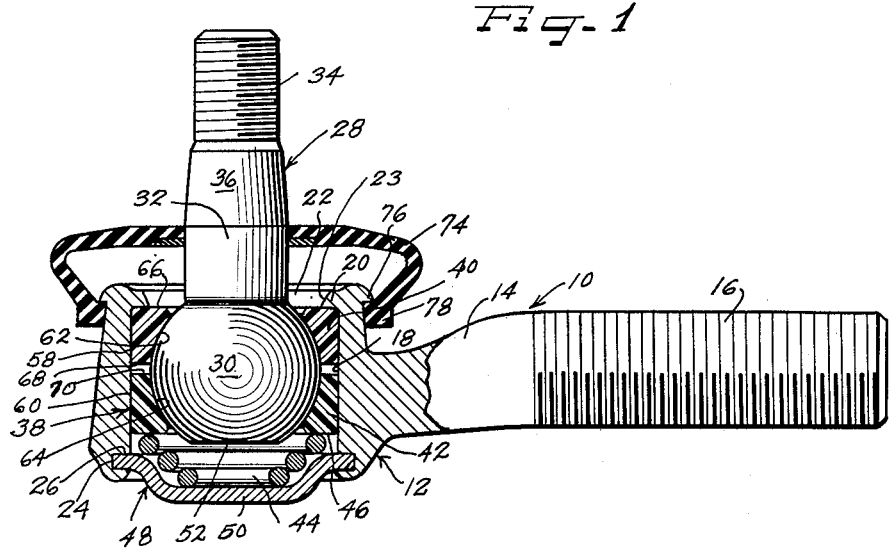
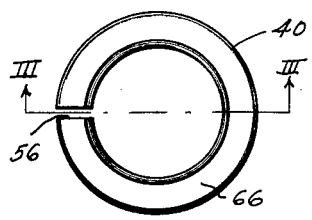
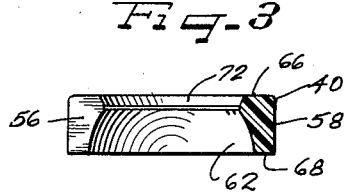
INVENTOR.
Edward J. Herbenar
BY
ATTORNEYS United States Patent Office 3,128,110
Patented Apr. 7, 1964

3,128,110
BALL JOINT
Edward J. Herbenar, Detroit, Mich., assignor to Thompson Ramo Wooldridge Inc., Detroit, Mich., a corporation of Ohio
Filed May 3, 1961, Ser. No. 107,408
1 Claim. (Cl. 287—99)

This invention relates to ball joints of the type commonly found in vehicle steering linkages and suspension components and more particularly to a permanently lubricated ball joint which maintains a tight contact between the bearing for the ball stud and the socket, together with nearly constant rotating load even after wear may have taken place.

Heretofore, a variety of ball joints have been available which have provided for adjustment to accommodate wear, such as the ball joint in James H. Booth Patent No. 2,507,087 patented May 9, 1950. This latter structure is characterized by a press-fit relation between an upper bearing ring on the socket and a sliding fit between a lower bearing ring and the socket, together with resilient means for urging the lower slidable member against the ball head of the ball stud. While this structure is extremely advantageous, the sliding fit of the lower ring member does not positively assure a relatively stable or fixed position between the lower ring member and the socket during use, with the result that variations in rotating load may occur during use. Also, previous ball joints having wedge type or spherical dome type sockets have had an unseating characteristic, while in other types of joints, a permanent connection between bearing and socket has entailed close tolerances and manufacturing difficulties, as well as preventing wear take-up.

The present invention overcomes the problems encountered with previous ball joints in a manner which affords utility for the joint with respect to any linkage or hinge requiring rotation and angular motion. Thus the assembly forming the joint is comprised of a ball stud and upper and lower bearing halves receiving the ball head of the ball stud therein for rotational and angular movement. The bearing halves may be identical in order to facilitate manufacture, but in given applications a non-identical construction may afford definite advantages. The bearing halves are preferably dimensioned to have a predetermined initial clearance with respect to a socket body in which they are received, but are urged by spring means bearing against an end cap or plug and the lower bearing half into tight engagement with the inner wall of the socket or housing. The spring means may be an inverted conical compression spring, a wave washer spring, a Belleville spring or a rubber spring, for example. The movement of the bearing halves into engagement with the inner socket wall is accomplished by splitting each of the bearing halves along a preferably radial line on one side of the bearing halves.

An advantage of this construction is that it is relatively insensitive to clearance or interference fits due to tolerance stack-ups. and because of this split bearing feature an interference fit can also be designed into the structure while still providing the desired performance. Therefore, a wide range of dimensional variation in the fit of the bearing relative to the socket bore may be accommodated within the scope of the invention. Thus the bearing halves constitute unitary structures which are nevertheless adapted to expand as they are individually urged toward the major diameter of the ball head by the said spring means. The lower bearing half is expanded by the spring means, which causes it to move toward the great diameter of the ball head as described, while the upper bearing half is expanded by the ball stud which is urged upwardly by the spring means and the lower bearing half. The upper bearing half is retained in position by a shoulder forming an opening in the socket to receive the stud shank so as to maintain the said upper bearing half in position as the ball head is moved relatively upwardly by the spring means. Accordingly, the split in the bearing halves permits them to expand tightly against the socket wall or bore. As wear takes place, the bearing halves move toward each other, thereby maintaining the snug fit against the socket wall.

In order to afford a permanent lubrication for the ball joint, the bearing halves are formed from a material having a low coefficient of friction such as a polyamide of high molecular weight, of which nylon is a suitable example, a high density polyethylene or the like. This characteristic of the bearing halves affords the near constant rotating load throughout the life of the assembly hereinabove referred to.

A dust-jacket of cap-like construction is mounted on the upper end of the socket in sealing relationship to the stud shank to prevent escape of initially supplied lubricant. This construction provides for the assembly an ability to operate without the need for additional lubricant.

Accordingly, it is an object of the present invention to provide a ball joint which is applicable to any linkage or hinge requiring rotation and angular motion.

Another object of the invention is to provide a ball joint as described which maintains a tight bearing to socket contact without the need for close tolerances in the bearing halves and socket.

Another object of the invention is to provide a ball joint bearing as described which affords near constant rotating load even after wear has occurred.

Another object of the invention is to provide a ball joint which is permanently lubricated.

Another and highly important object of the invention is to provide a ball joint as described which eliminates the unseating characteristic common in wedge-type sockets and spherical dome-type sockets, as the result of a straight side wall construction for the socket.

Another object of the invention is to provide a ball joint having a low noise-transmission characteristic.

Yet another object of the invention is to provide a ball joint having excellent shock damping and absorbing characteristics as the result of the construction and material for the bearing halves.

Other objects and advantages of the invention will become apparent as the description proceeds in accordance with the drawings in which:

FIGURE 1 is a vertical sectional view of a ball joint according to the present invention;

FIGURE 2 is a top plan view of a bearing half according to the present invention; and FIGURE 3 is a vertical sectional view taken through the line III—III in FIGURE 2.

Referring now to the drawings, the joint assembly 10 of the invention comprises a housing or socket 12 having a laterally extending rod-like stem or shank 14 which may be threaded at 16 for threaded engagement in a bracket such as is carried on the upper or lower wheel suspension arm of a front wheel suspension for an automobile. However, the joint 10 is also suitable for use with any linkage or hinge requiring rotation and angular motion. The socket 12 has a preferably cylindrical bore 18 therethrough to form a substantially axially extending side wall with advantages hereinafter further described resulting therefrom. The socket 12 defines an inwardly extending shoulder 20 at an upper end thereof partially overlying the upper end of the bore 18 and the shoulder 20 defines an opening 22 within edge 23, which is preferably beveled upwardly and outwardly. The other end of the bore 18 has a counter bore 24 therein extending to a shoulder 26.

A ball stud 28 has a ball end or head 30 disposed in the cylindrical chamber thus formed by the bore 18. This ball head 30 has a shank 32 extending therefrom through the aperture 22 in the socket, with the beveled construction of the opening 22 affording unobstructed rotatable and tiltable movement as required for the ball shank. The ball shank may also have a reduced end portion 34 which is preferably threaded so that when a slightly tapered intermediate portion 36 thereof is inserted into the eye of a wheel bracket or the like (not shown), a nut (not shown) may be threaded on the said portion 34 to hold the tapered portion 36 in locked position in the eye receptacle.

A bearing, generally indicated by reference numeral 38, is disposed in the bore 18 in surrounding relationship to the ball head 30, and is comprised of an upper bearing half 40 and a lower bearing half 42 as hereinafter further described. Although the bearing halves 40 and 42 are preferably identical to facilitate ease in manufacture, a non-identical construction wherein one of the bearings has greater axial dimension than the other will be advantageous in some applications of the invention.

In order to urge the bearing 40 into uniform bearing relationship with the ball head 30, also as hereinafter further described, a spring means 44 is provided which may be of an inverted frusto-conical configuration as shown. However, spring means other than conical compression springs may also be used within the scope of the invention, as for example a wave washer spring, a Bellevile spring, or a rubber spring. The spring means 44 bears against a lower wall 46 of the bearing half 42 and against an end plug or cap 48 forming a bottom wall for the socket chamber. The plug 48 fits in the counterbore 24 and is bottomed against the shoulder 26. The socket is then spun under the peripheral portion of the plug 48 to lock the plug or end cap in the counterbore and against the shoulder 26. The plug 48 preferably has a depressed central portion 50 to receive the spring 44, and against which the lower end of the spring bottoms as described. Thus it will be seen that space is provided by this localized outwardly convex deformation to receive the stud 28 and the ball head 30 with clearance therefor, with the inverted frusto-conical configuration of the spring accommodating the ball head. Also, the ball head 30 preferably may have a segmental end surface 52 to provide further clearance in this area if desired.

The upper and lower bearing halves 40 and 42 are resilient, unitary annular structures and are each split at one side thereof along a preferably radially extending line or cut as designated by reference numeral 56 in FIGURES 2 and 3 to provide an expansible characteristic therefor. An advantage of this construction is that it is operational with varying clearance or interference fits between the bearing halves and the bore 18 due to tolerance stack-ups, and an interference fit could be designed into the structure and still provide the desired performance. In a preferred form of the invention, a slight amount of clearance exists between the outer diameter surfaces 58 and 60 of the bearing halves 40 and 42 and the cylindrical side wall of the bore 18 of the socket in the initial free state or unstressed condition of the bearing halves. The surfaces 58 and 60 have a cylindrical configuration complementary to the side wall, and the bearing halves also define internal surfaces 62 and 64 of substantially segmental spherical configuration complementary to the ball head 30. The internal surfaces 62 and 64 converge from a diameter which is somewhat smaller than the major diameter of the ball head 30. The upper bearing half 40 seats against the shoulder 20 along an upper surface 66 at the top of the said bearing half, and it will be seen that the lower surface 68 of the upper bearing half 40 and the upper surface 70 of the lower bearing half 42 are spaced from one another axially, and also spaced from the major axis of the ball head 30 as also hereinafter further described.

The bearing halves 40 and 42 are preferably formed with a bevel surface such as is provided at 72 for the upper bearing 40 to accommodate tiltable movement of the stud 28. Thus the individual bearing halves may be formed identically, and they are made of a material having a low coefficient of friction such as a high molecular polyamide (e.g. nylon) of a high density polyethylene, thereby permitting a near constant rotating load to be maintained throughout the life of the assembly.

In order to prevent escape of lubricant which may be supplied initially (not shown), a dust jacket or cap 74 of flexible material engages the stud shank 32 in sealing relationship and extends outwardly and downwardly into locked relationship beneath a radially outwardly turned shoulder 76 on the socket 12. A bead 78 may be formed at the lower margin of the cap 74 to cooperatively lock with the shoulder 76.

In accordance with the invention, prior to the application of the spring load against the bearing halves 40 and 42, a slight amount of clearance exists between the cylindrical outer diameter surfaces 58 and 60 and the cylindrical wall of bore 18. Thus, as hereinabove set forth, the greatest diameter of the inner surfaces 62 and 64 is less than major diameter of the ball stud. Upon application of load thereto by the helical spring 44, the split 56 in the respective bearing halves 40 and 42 affords expansion thereof into tight engagement with the socket wall, the upper bearing half 40 being expanded by the ball stud head 30 and the lower bearing half 42 being expanded by the spring 44. As wear takes place, the bearings move axially toward each other as urged by the spring 44, thereby maintaining a snug contact with the ball as well as with the socket walls.

Thus, in operation, the spring 44 urges the lower bearing half 42 into wedged relationship between the stud ball head 30 and the bore wall 18. Because of the segmental spherical configuration of the inner surface 64 of the lower bearing half 42, a force vector is applied against the stud ball head 30 which is effective to urge it upwardly against the upper bearing half 40. The corresponding segmentally spherical configuration of the inner surface 62 of the upper bearing half 40 affords a transmission of force from the ball head 30 to the upper bearing half 40, to seat the upper bearing half 40 firmly against the shoulder 20.

The wedging action effected by the spring 44 on the lower bearing half 42 as above described also creates a force vector directed radially outwardly such as to press the outer wall 60 of the said lower bearing half tightly against the wall of the bore 18. Likewise, the wedging action on the upper bearing half 40 produced by the ball head 30 as above described, effects a radially outwardly directed force vector such as to urge the outer wall 58 of the upper bearing half into tight engagement with the wall of the bore 18.

Thus it will be seen that although relative freedom of movement for the respective bearing halves 40 and 42 is afforded in their unstressed condition, since they are constructed to have an initial clearance relative to the inner diameter or bore surface 18 of the socket, when a load is applied against these elements through the spring 44, a tight engagement with the socket is effected. Therefore, wear takeup is automatically accomplished by the constant action of the spring means 44, so that the bearing halves may move further pursuant to such wear to maintain their snug fit. Thereby also, a substantially constant surface is presented to the ball stud head 30 and a near constant rotating load is maintained throughout the life of the assembly, particularly in view of the material of low coefficient of friction from which the bearing halves are formed.

In this connection, it may be noted that the outer cylindrical surfaces 58 and 60 of the said bearing halves 40 and 42 may be substantially unfinished while the inner surfaces 62 and 64 may be given a smooth finish for antifriction relationship with the ball head 30. Further, there is no need for smoothly finishing the inner surface of the side wall of the bore 18, since an unfinished wall surface will afford a positive means of maintaining the bearing halves in position during such time as a radially outwardly directed load is imparted therethrough to urge the surfaces 58 and 60 into tight engagement with the socket wall. However, it will be understood that the radially outwardly directed forces are, when coupled with the split construction of the bearing members which provides constant tight contact between the bearings and the socket wall under load but instant spring biased axial adjustment when the joint again becomes unloaded, adequate to maintain a secure positioning of the respective bearing halves and to prevent unseating.

Because of the relative movability of the bearing halves at such time as load between the said bearing halves and the socket is diminished as the result of wear or the like, adjustment for wear take-up is readily accomplished and therefore an automatic means is provided of maintaining a near constant rotating load after such wear has taken place.

A further and extremely advantageous feature of the invention is that the unseating characteristic of wedge type sockets and spherical dome-type sockets is eliminated. Thus, the invention provides for a cylindrical, straight side wall construction for the bore 18 and a complementary cylindrical or straight side wall construction for the exterior or outer diameter walls 58 and 60 of the bearing halves 40 and 42. This complementary relationship assures a constant load between the surfaces 18 and 58 and 60 respectively, despite any slight axial variation in the position of the bearing halves relative to the socket.

Accordingly, there has been provided a ball joint which is extremely simple and effective, and is applicable to vehicle steering linkage and suspension components as well as to any linkage or hinge requiring rotation and angular motion. The structure of the joint facilitates rotation as well as tiltable movement of the stud, since a near constant rotating load is maintained on the bearing, and further, the near constant rotating load in itself reduces wear and minimizes heat of friction which would tend to deteriorate the bearing material. A further advantage of the invention is that the bearing structure is essentially self-lubricating while the dust jacket on the sealing cap 74 maintains grease within the joint so that no additional lubricant is required.

Also, the joint of the invention is characterized by low noise transmission, excellent shock damping and absorption, particularly in view of the resilient nature of the material forming the bearing halves, and elimination of the unseating characteristics with wedge-type sockets, spherical dome-type sockets or the like, and a wide range of dimensional possibilities in the fit of the bearing to the socket bore is afforded by the split in the bearing construction.

Although I have herein set forth and described my invention with respect to particular principles and details thereof, it will be understood by those skilled in the art that these may be varied without departing from the spirit and scope of the invention as set forth in the hereunto appended claim.

I claim as my invention:

A ball joint comprising
   a socket having a chamber formed therein with a cylindrical side wall,
      said socket having a shoulder partially overlying one end of said chamber to form an opening into said chamber,
   a ball stud having a segmental spherical ball head in said chamber and a shank extending rotatably and tiltably outwardly through said opening,
   axially spaced upper and lower annular bearing halves in said chamber snugly receiving said ball head in bearing relation,
   a closure plate secured at the other end of said chamber,
   spring means in said chamber opposite said opening and engaging said closure plate urging said lower bearing half against said ball head and thereby urging said ball head against said upper bearing half and said upper bearing half against said shoulder,
      said bearing halves each having inner segmental spherical surfaces conforming to and engaging said ball head in snug bearing relationship and each having exterior surfaces shaped complementarily to the cylindrical side wall of the chamber,
      said bearing halves each being split substantially axially relative to the chamber for resiliently varying the diameter of the exterior surface of the bearing halves relative to the diameter of the chamber to expand the diameter of the exterior surface of the bearing halves in the chamber due to the lateral expanding effect thereon from the ball head and the spring means when the outside diameter of the bearing halves is less than the diameter of the cylinder,
whereby snug engagement of the bearing halves in the chamber is attained between the diameter of the exterior surfaces of the bearing halves and the diameter of the cylinder.

References Cited in the file of this patent
UNITED STATES PATENTS

| | | |
|---|---|---|
| 2,115,087 | Schaefer | Apr. 26, 1938 |
| 2,749,161 | Latzen | June 5, 1956 |
| 3,004,786 | Herbenar | Oct. 17, 1961 |
| 3,073,634 | Gottschald | Jan. 15, 1963 |

OTHER REFERENCES

Ehrenreich, German application 1,014,441 printed Aug. 22, 1957 (KL 63c 47).